United States Patent
Fischer et al.

(10) Patent No.: US 7,156,413 B2
(45) Date of Patent: Jan. 2, 2007

(54) DETENT CONNECTION PIECE AND GAS BAG MODULE

(75) Inventors: Anton Fischer, Leinweiler (DE); Hans-Joachim Tietze, Heubach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 268 days.

(21) Appl. No.: 10/736,391

(22) Filed: Dec. 15, 2003

(65) Prior Publication Data

US 2004/0169357 A1    Sep. 2, 2004

(30) Foreign Application Priority Data

Dec. 19, 2002   (DE) ................. 202 19 741 U

(51) Int. Cl.
  *B60R 21/16* (2006.01)
(52) U.S. Cl. .................................. 280/728.2
(58) Field of Classification Search ........... 280/728.2, 280/728.1, 730.2; 248/222.11
  See application file for complete search history.

(56) References Cited

U.S. PATENT DOCUMENTS 5,556,224 A * 9/1996 Niskanen ................ 403/379.2
6,851,702 B1 * 2/2005 Henderson et al. ...... 280/728.2

FOREIGN PATENT DOCUMENTS

| DE | 19828975 | 12/1999 |
|----|----------|---------|
| DE | 19845570 | 4/2000  |
| DE | 69605371 | 7/2000  |
| JP | 10153204 | 6/1998  |

* cited by examiner

*Primary Examiner*—Faye M. Fleming
(74) *Attorney, Agent, or Firm*—Tarolli, Sundheim, Covell & Tummino LLP

(57) ABSTRACT

A detent connection piece (10) includes a clip hook (18) which can be pressed into a first bore (24) while being deformed until the detent connection piece snaps in and engages behind a bearing edge framing the first bore (24). The detent connection piece (10) additionally includes an end section which is adapted to be inserted into a second bore (26). Further proposed is a gas bag module including at least one such detent connection piece (10).

5 Claims, 4 Drawing Sheets

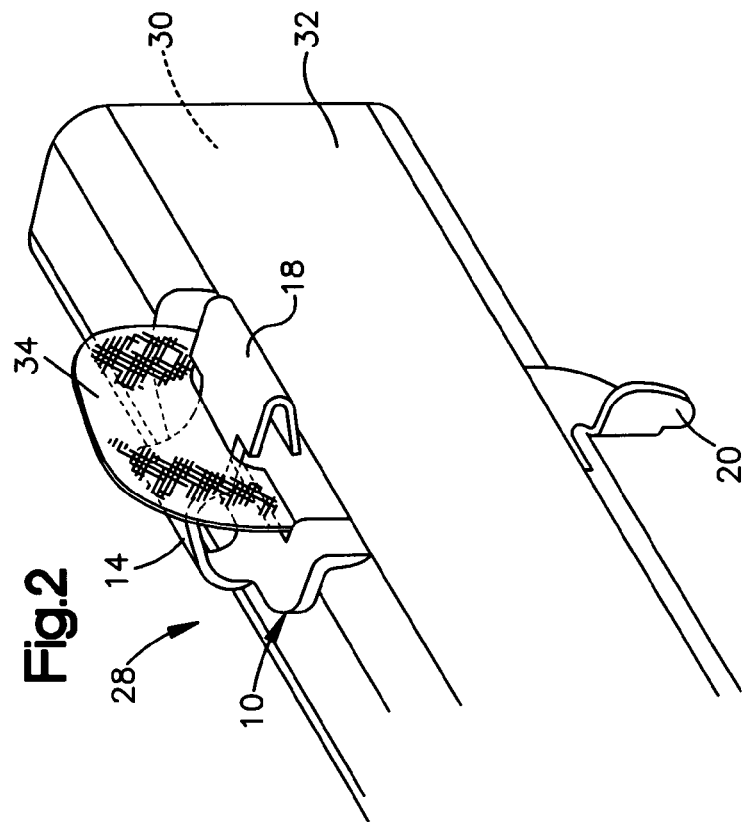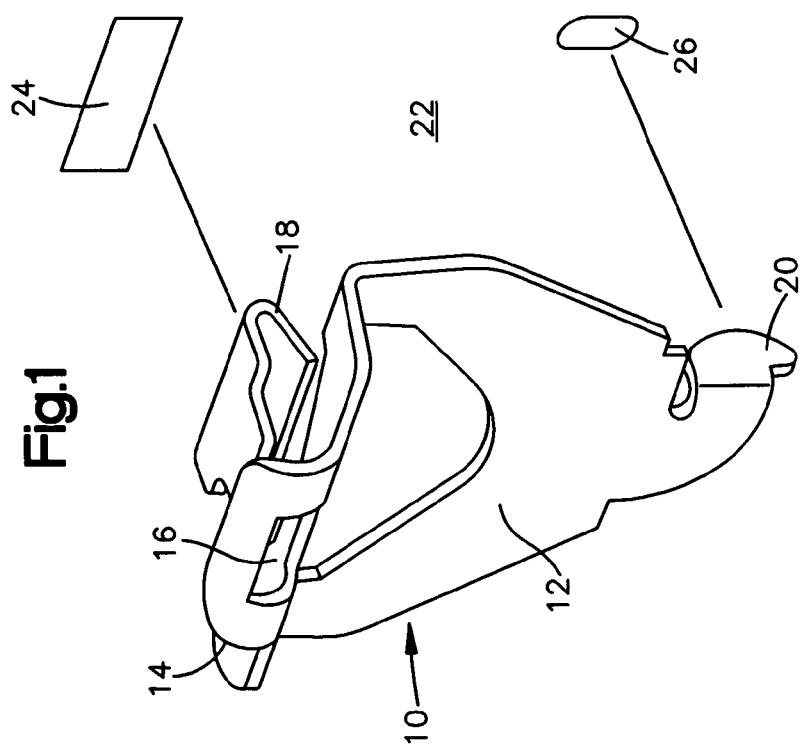

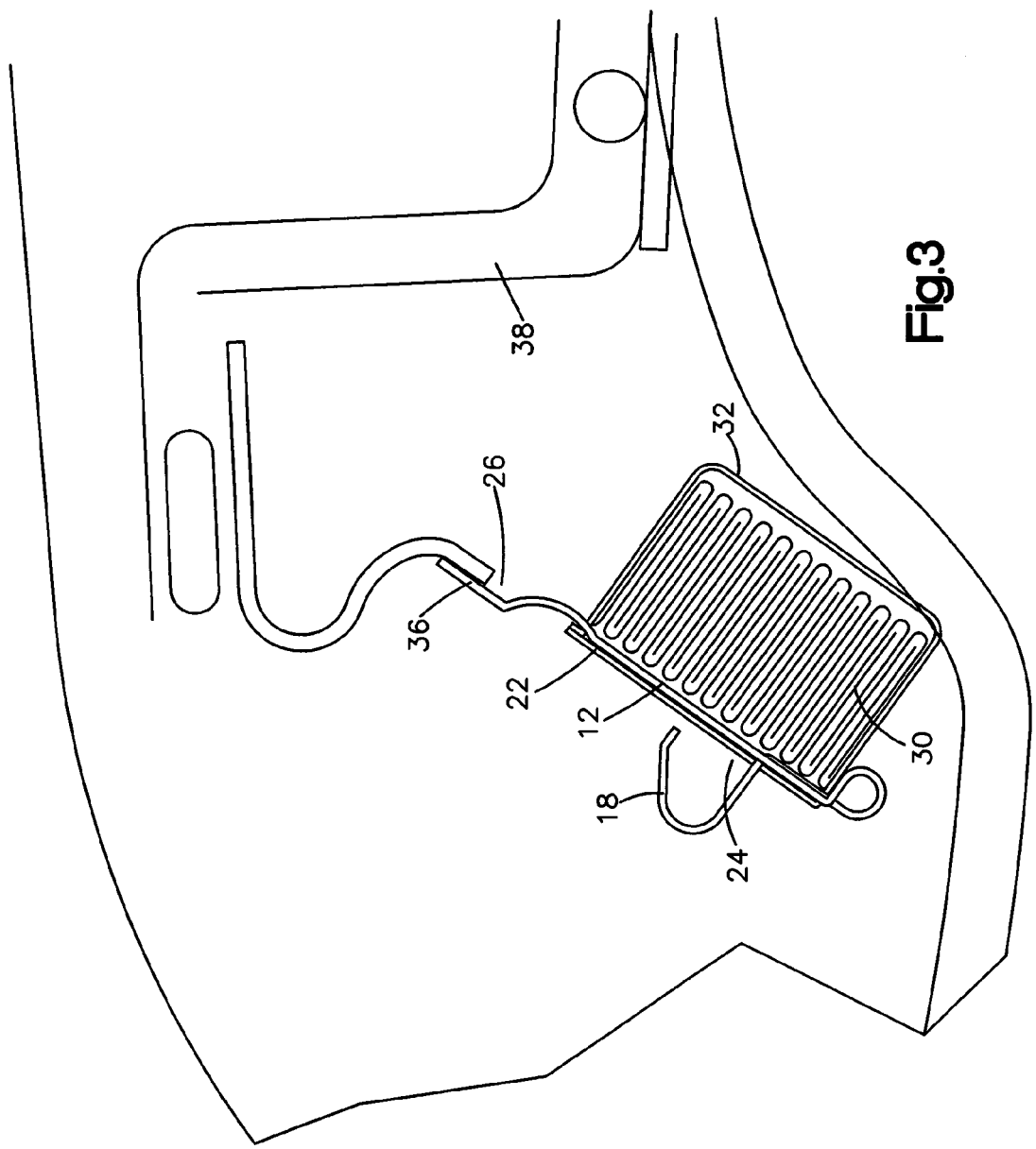

DETENT CONNECTION PIECE AND GAS BAG MODULE

TECHNICAL FIELD

The present invention relates to a detent connection piece. The present invention further relates to a gas bag module.

BACKGROUND OF THE INVENTION

Conventional detent connection pieces include a clip hook that can be pressed into a first bore while being deformed until the detent connection piece snaps in and engages behind a bearing edge framing the first bore. A conventional gas bag module includes a gas bag and a protective sheathing surrounding the gas bag.

For the fastening of gas bag modules which are provided to protect the head of a vehicle occupant in a side impact, holding sections are usually provided on the gas bag module, which are screwed onto a lateral or upper section of the body of the vehicle. In the case of alternative clip connections, care must be taken in particular that an unintentional removal of the gas bag module is avoided.

BRIEF SUMMARY OF THE INVENTION

The present invention provides a detent connection which is simple to produce between a gas bag module and a vehicle body section, which works without screws and is nevertheless particularly firm and secure. According to the invention, a detent connection piece comprises a clip hook which can be pressed into a first bore while being deformed until the detent connection piece snaps in and engages behind a bearing edge framing the first bore. The detent connection piece additionally includes an end section which is adapted to be inserted into a second bore. The end section can take up almost all of the forces acting on the detent connection, so that the security of the entire detent connection no longer depends solely on the connection of the clip hook.

The present invention further provides a gas bag module, in particular a side gas bag module. According to the invention, the gas bag module comprises a gas bag and a protective sheathing surrounding the gas bag. The gas bag module comprises at least one detent connection piece according to the invention.

Advantageous developments of the detent connection piece according to the invention and of the gas bag module are indicated in the respective dependent claims.

BRIEF DESCRIPTION OF THE DRAWINGS

FIG. 1 shows a perspective view of a detent connection piece according to a first embodiment of the invention in front of a vehicle body section;

FIG. 2 shows a perspective view of a gas bag module according to the invention with the detent connection piece of FIG. 1;

FIG. 3 shows a sectional view of a gas bag module according to the invention in the installed condition with a detent connection piece according to a second embodiment of the invention.

DETAILED DESCRIPTION OF PREFERRED EMBODIMENTS

Figure 4:
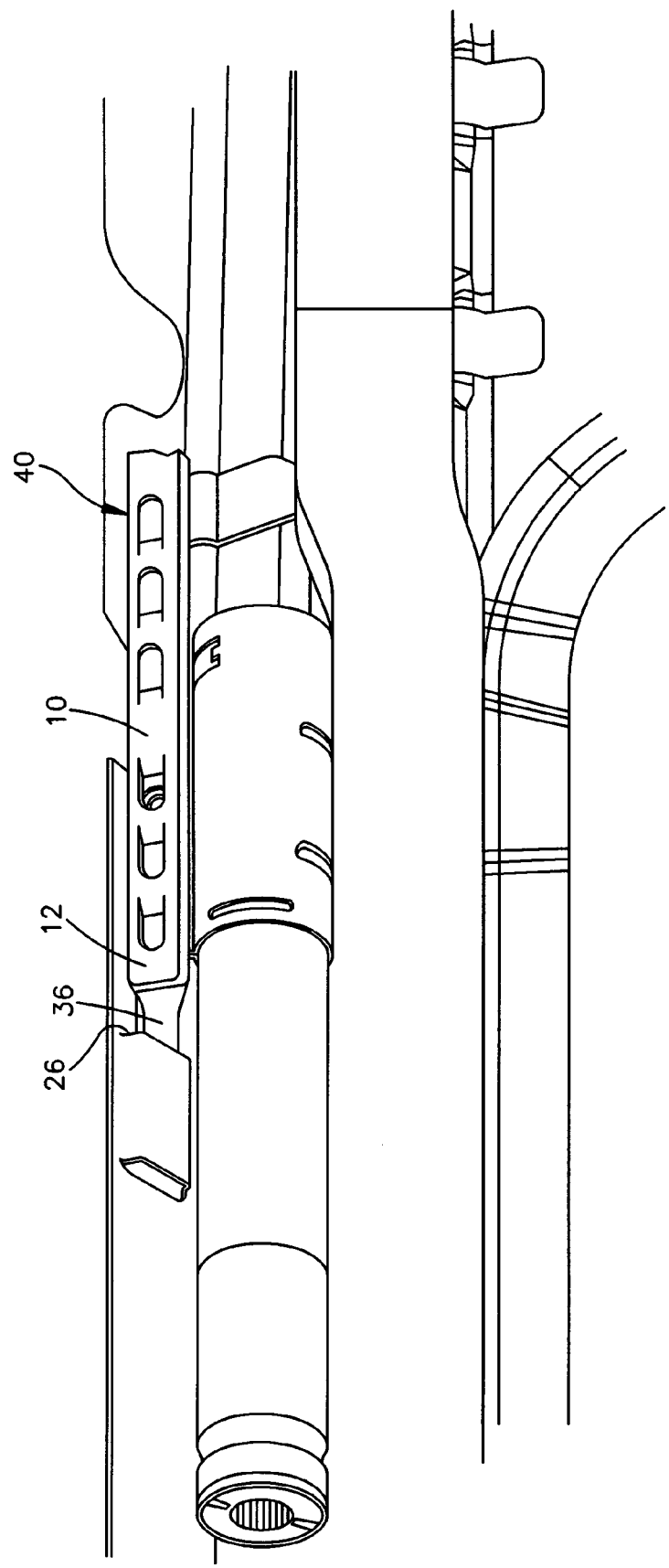
FIGS. 4 and 5 show a side view and a perspective view, respectively, of a gas bag module according to the invention in the installed condition with a detent connection piece according to a variant of the second embodiment.

The detent connection piece 10, formed from spring steel, illustrated in FIG. 1, has a flat central section 12, at the upper end of which (in accordance with the illustration in FIG. 1) an elastically flexible transition section 14 adjoins, which is bent several times about parallel axes and has an opening 16. The transition section 14 continues into a first end section which is bent around so that it forms a clip hook 18, the clip hook 18 extending in a direction perpendicular to the plane of the central section 12. Adjoining the lower end of the central section 12 is a narrow second end section which is bent through 90 degrees away from the plane of the central section 12, the bending axis running parallel to the plane of the central section 12 but perpendicular to the bending axes of the upper transition section 14. The second end section forms a guide hook 20 which extends in the same direction as the clip hook 18.

In the body section 22, to which the detent connection piece 10 is to be fastened, two bores 24, 26 are provided, the first bore 24 being coordinated with the clip hook 18 and the second bore 26 being coordinated with the guide hook 20.

FIG. 2 shows a gas bag module 28, in which the detent connection piece 10 shown in FIG. 1 is used for the installation of the gas bag module 28 on the body section 22. The gas bag module 28 comprises a folded gas bag 30 which is drawn into a protective sheathing 32, a gas bag tongue 34 with an opening projecting out of the protective sheathing at the top. The gas bag tongue 34 is pulled over the clip hook 18 of the detent connection piece 10, which is arranged between the gas bag folded package and the protective sheathing 32 such that the clip hook 18 and the guide hook 20 project laterally out from the protective sheathing 32.

To mount the gas bag module 28 to the body section 22, firstly the guide hook 20, supported by an angling of the detent connection piece 10, is introduced into the second bore 26. Then the clip hook 18 is pressed into the first bore 24 by tilting the detent connection piece 10. In so doing, the lower tongue of the clip hook 18 is pressed elastically upwards by the lower edge of the first bore 24, until the clip hook 18 is fully introduced into the first bore 24 and snaps in, so that the lower tongue of the clip hook 18 engages behind a bearing edge of the body section beneath the first bore 24. The pressing in of the clip hook 18 into the first bore 24 is possible with justifiable application of force owing to the elasticity of the transition section 14. With the clip hook 18 fully pressed in, the elastically yielding transition section 14 additionally provides for a prestressing between the central section 12 and the clip hook 18 engaging behind the body, so that as a whole a secure fastening of the gas bag module 28 is ensured, avoiding rattling noises. The guide hook 20, which is securely arrested in the second bore 26, provides for a load axis separation, because it is not the clip hook 18, but rather the guide hook 20 which takes up almost all the forces. The clip hook 18 merely has to compensate for the forces directed perpendicularly from the body section 22.

When the gas bag 30 unfolds downwards on activation of the gas bag module 28, the clip hook 18 behind the first bore 24 in the body section 22 is pulled further downward by the tensile stress on the gas bag tongue 34. Thereby, the detent connection is additionally secured against the clip hook 18 springing out from the first bore 24.

Several detent connection pieces 10 can of course also be provided for mounting the gas bag module 28.

A removal of the gas bag module 28 is possible using a screwdriver or a similar tool. To this end, the screwdriver is inserted into the opening 16 of the transition section 14 and the clip hook 18 is levered out. By way of a tilting movement opposite to that performed in installation, the guide hook 20 can then be drawn out from the second bore 26. Any inadvertent removal is therefore ruled out.

In the detent connection piece 10 illustrated in FIG. 3, the second end section is designed as a flat attachment section 36 which extends in a plane parallel to the plane of the central section 12.

This embodiment of the detent connection piece 10 according to the invention is advantageous in particular in installation situations in which it is fairly difficult to connect the gas bag module 28 by means of screws or clips. This may be the case in side gas bag modules, for instance, which are installed close to a deep-drawn sliding roof case 38, as shown in FIG. 3.

The gas bag module 28 is first nested by the attachment section 36 in the second bore 26 of the body section 22 so that the attachment section 36 engages behind a bearing edge framing the bore 26. The attachment section 36 may be made to be elastically deformable to facilitate insertion. The gas bag module 28 is then pressed against the body section 22, accompanied by the clip hook 18 of the detent connection piece 10 snapping into the first bore 24 of the body section 22, as described above in connection with the first embodiment.

Figure 5:
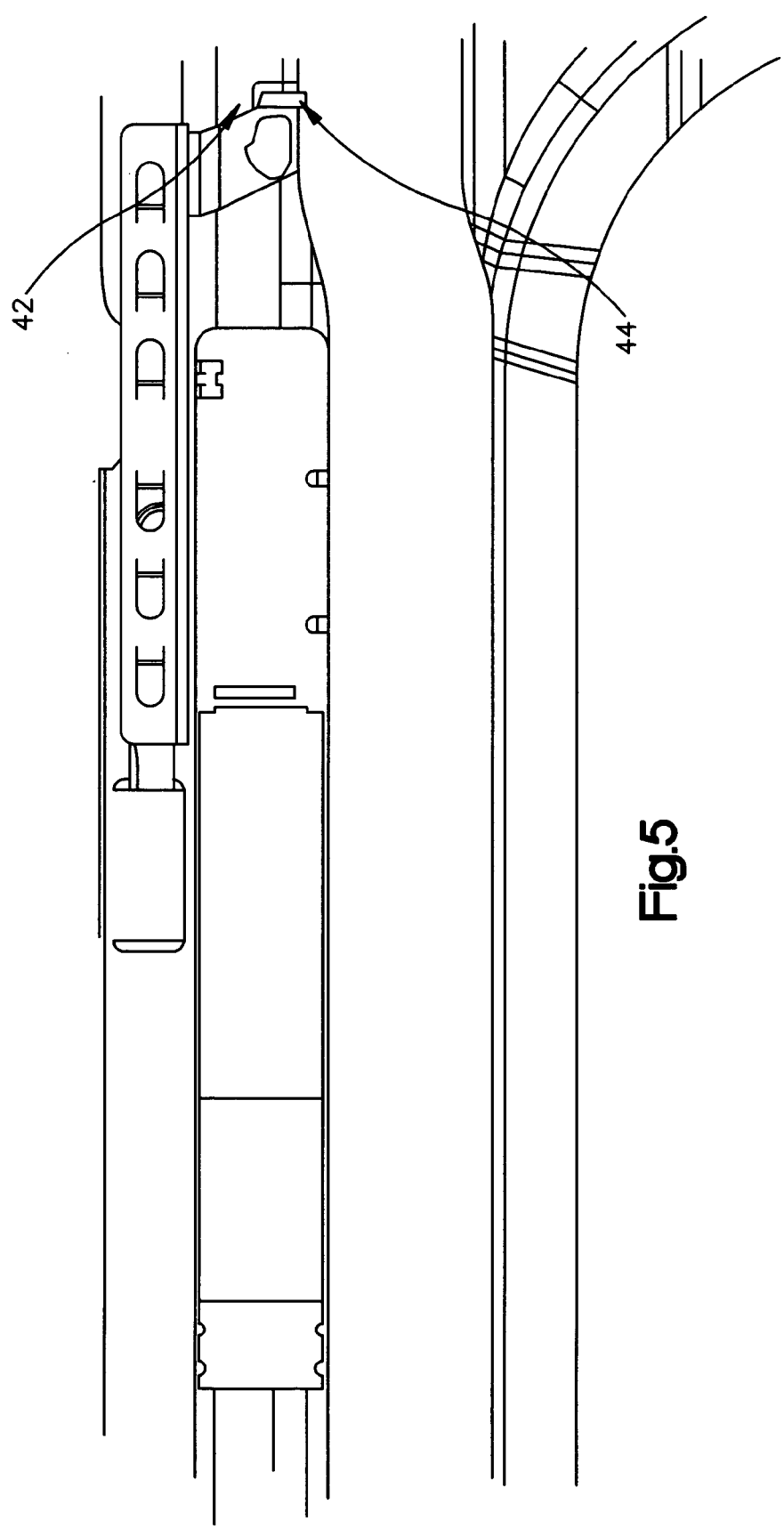

In the variant illustrated in FIGS. 4 and 5, the detent connection piece 10 is embodied in one piece with a housing strip 40 of the gas bag module 28. The attachment section 36 is turned in relation to the central section 12 of the detent connection piece 10 and engages behind a tongue of the body section, the opening 26 of which corresponds to the second bore in the previously described embodiments. As shown in FIG. 5, the gas bag module 28 is nested in a recess 42 in the body section under pretension by means of ribs 44 at the end portion of the housing strip 40 opposite the attachment section 36.

In this way, the gas bag module 28 can be installed without the use of screws at locations that are hard to access. Owing to the pretension achieved with the aid of the attachment section 36, rattling noises are avoided.

The invention claimed is:

1. A gas bag module comprising a gas bag (30) and a protective sheathing (32) surrounding said gas bag (30), characterized in that said gas bag module (28) comprises at least one detent connection piece (10) including a clip hook (18) which can be pressed into a first bore (24) while being deformed until said detent connection piece snaps in and engages behind a bearing edge framing said first bore (24), said detent connection piece (10) additionally including an end section which is adapted to be inserted into a second bore (26).

2. The gas bag module according to claim 1, characterized in that said detent connection piece (10) is configured in one piece with a housing part of said gas bag module (28).

3. The gas bag module according to claim 1, characterized in that a tongue (34) of said gas bag (30) is pulled over said clip hook (18) of said detent connection piece (10).

4. The gas bag module according to claim 1, characterized in that said detent connection piece (10) is arranged between said gas bag (30) and said protective sheathing (32), with said clip hook (18) and said end section projecting out of said protective sheathing (32).

5. A detent connection system for fastening a gas bag module (28) to a body section (22) of a vehicle, said gas bag module (28) comprising a detent connection piece (10) having a clip hook (18) which is pressed into a first bore (24) of said body section (22) while being deformed until said detent connection piece (10) snaps in and engages behind a bearing edge framing said first bore (24), said detent connection piece (10) additionally including an end section which is inserted into a second bore (26) of said body section (22).

* * * * *